(12) United States Patent
Asakura et al.

(10) Patent No.: US 6,964,515 B2
(45) Date of Patent: Nov. 15, 2005

(54) TEMPERATURE DETERMINING DEVICE, TEMPERATURE CORRECTING METHOD, AND IMAGE FORMING APPARATUS

(75) Inventors: Kenji Asakura, Souraku-gun (JP); Keisuke Fujimoto, Hirakata (JP); Masaaki Nakano, Shijonawate (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/726,965

(22) Filed: Dec. 2, 2003

(65) Prior Publication Data

US 2004/0109490 A1 Jun. 10, 2004

(30) Foreign Application Priority Data

Dec. 6, 2002 (JP) .............................. 2002-355899

(51) Int. Cl.⁷ .......................... G03G 15/20; G01K 1/14; G01J 5/08
(52) U.S. Cl. .................... 374/133; 374/2; 374/126; 374/134; 374/153; 399/69; 219/216
(58) Field of Search ......................... 374/153, 154, 374/134, 141, 208, 179, 120, 121, 126, 133, 374/1, 2; 399/69, 328; 219/216

(56) References Cited

U.S. PATENT DOCUMENTS

| | | | | |
|---|---|---|---|---|
| 2,837,917 A | * | 6/1958 | Machler | 374/126 |
| 2,846,882 A | * | 8/1958 | Gray | 374/126 |
| 3,285,069 A | * | 11/1966 | Weiss | 374/133 |
| 4,420,265 A | * | 12/1983 | Everest et al. | 374/124 |
| 4,634,294 A | * | 1/1987 | Christol et al. | 374/124 |
| 4,722,612 A | * | 2/1988 | Junkert et al. | 374/133 |
| 4,900,162 A | * | 2/1990 | Beckman et al. | 374/2 |
| 4,993,419 A | * | 2/1991 | Pompei et al. | 374/130 |
| 5,056,929 A | * | 10/1991 | Watanabe et al. | 136/230 |
| RE34,507 E | * | 1/1994 | Egawa et al. | 374/133 |
| 5,287,155 A | * | 2/1994 | Arai et al. | 399/69 |
| 5,333,784 A | * | 8/1994 | Pompei | 374/121 |
| 5,735,604 A | * | 4/1998 | Ewals et al. | 374/134 |
| 5,999,768 A | * | 12/1999 | Gillen et al. | 374/153 |
| 6,043,493 A | * | 3/2000 | Kim et al. | 250/338.1 |
| 6,367,972 B1 | * | 4/2002 | Kamiyama et al. | 374/133 |
| 6,654,571 B2 | * | 11/2003 | Nanataki et al. | 399/69 |
| 2001/0051057 A1 | * | 12/2001 | Tomita | 399/69 |
| 2002/0044801 A1 | * | 4/2002 | Omata et al. | 399/309 |
| 2003/0180062 A1 | * | 9/2003 | Suzuki | 399/69 |
| 2004/0057493 A1 | * | 3/2004 | Ishikawa et al. | 374/120 |

FOREIGN PATENT DOCUMENTS

| | | | | |
|---|---|---|---|---|
| EP | 1182519 A2 | * | 2/2002 | G03G 15/20 |

(Continued)

*Primary Examiner*—Gail Verbitsky
*Assistant Examiner*—Stanley J. Pruchnic, Jr.
(74) *Attorney, Agent, or Firm*—Hamre, Schumann, Mueller & Larson, P.C.

(57) ABSTRACT

A temperature determining device is composed of a temperature detecting unit that detects a temperature of a determination object member based on an intensity of infrared rays from the object member, a unit for determining a temperature for correction that determines a temperature of an opposing member opposed to the object member or a temperature of a member whose temperature changes in correlation to a change in the temperature of the opposing member, and a calculating unit that corrects the detected temperature obtained by the temperature detecting unit using the temperature as the temperature for correction obtained by the unit for determining a temperature for correction. Thus, stable temperature determination can be performed accurately without being influenced by infrared rays from around a determination object member.

34 Claims, 6 Drawing Sheets

FOREIGN PATENT DOCUMENTS

| JP | 2001-034109 | | | 2/2001 | | |
| JP | 2002-228523 | | | 8/2002 | | |
| JP | 2003028721 | A | * | 1/2003 | .......... | G03G 15/20 |
| JP | 2003162177 | A | * | 6/2003 | .......... | G03G 15/20 |
| JP | 2004045330 | A | * | 2/2004 | ............. | G01J 5/02 |
| JP | 2004093651 | A | * | 3/2004 | .......... | G03G 15/20 |

* cited by examiner

TEMPERATURE DETERMINING DEVICE, TEMPERATURE CORRECTING METHOD, AND IMAGE FORMING APPARATUS

BACKGROUND OF THE INVENTION

1. Field of the Invention

The present invention relates to a temperature determining device that detects the temperature of a determination object member on the basis of the intensity of infrared rays. Furthermore, this invention relates to a temperature correcting method for use in determining temperature using an infrared temperature detecting unit. Moreover, this invention relates to an image forming apparatus that includes a temperature detecting unit for use in image forming apparatuses employing electrophotography and electrostatic recording that detects the temperature of a fixing member for fixing an unfixed image on the basis of the intensity of infrared rays from the fixing member.

2. Description of Related Art

JP2002-228523 A discloses a temperature calculating method using an infrared temperature detector. This temperature calculating method is illustrated in FIG. 11. As shown in the figure, in Procedure 1, an environmental temperature Tamb is calculated using a themistor output Vntc of a thermistor provided on a cold junction member of a thermopile. Then, in Procedure 2, a correction coefficient A is calculated using the environmental temperature Tamb. After that, in Procedure 3, temperature is calculated using the environmental temperature Tamb, the correction coefficient A, and a thermopile output Vout.

Furthermore, JP2001-34109 A discloses the use of an infrared temperature sensor in an image forming apparatus.

However, the above-mentioned temperature calculating method disclosed in JP2002-228523 A has presented the following problem.

That is, according to this method, in determining temperature, infrared rays that are radiated from peripheral members of a determination object member and then are reflected from a surface of the object member also are considered as infrared rays radiated from the object member. Therefore, even when the temperature of the object member is constant, the determined temperature may change due to a change in the temperature of the peripheral members. Conversely, if temperature control is performed with respect to the object member on the basis of the determined temperature thus obtained, the temperature of the object member may vary considerably.

SUMMARY OF THE INVENTION

It is an object of the present invention to solve the above-mentioned problem with the conventional technique and to provide a temperature determining device and a temperature correcting method that allow temperature determination of a determination object member to be performed accurately without being influenced by a change in temperature caused around the object member. Furthermore, it is another object of the present invention to provide an image forming apparatus that allows temperature determination of a fixing member to be performed accurately in thermally fixing an unfixed image, thereby allowing a high-quality image to be obtained stably.

In order to achieve the above-mentioned objects, a temperature determining device according to the present invention includes a temperature detecting unit that detects a temperature of a determination object member based on an intensity of infrared rays from the object member, a unit for determining a temperature for correction that determines a temperature of an opposing member opposed to the object member or a temperature of a member whose temperature changes in correlation to a change in the temperature of the opposing member, and a calculating unit that corrects the detected temperature obtained by the temperature detecting unit using the temperature as the temperature for correction obtained by the unit for determining a temperature for correction.

Furthermore, a temperature correcting method according to the present invention includes a first step of detecting a temperature of a determination object member based on an intensity of infrared rays from the object member, a second step of determining a temperature of an opposing member opposed to the object member or a temperature of a member whose temperature changes in correlation to a change in the temperature of the opposing member, and a third step of correcting the detected temperature obtained in the first step using the temperature obtained in the second step.

Next, an image forming apparatus according to the present invention includes a fixing unit that allows a toner image transferred on a transferring material to be fixed on the transferring material by heating the toner image under pressure. In the image forming apparatus, the fixing unit includes a fixing member that is brought into contact with the transferring material so as to heat the transferring material, a heating source that heats the fixing member directly or indirectly, a temperature detecting unit that detects a surface temperature of the fixing member based on an intensity of infrared rays from the fixing member, a unit for determining a temperature for correction that determines a temperature of a constituent member of the fixing unit opposed to the fixing member or a temperature of a member whose temperature changes in correlation to a change in the temperature of the constituent member, and a calculating unit that corrects the detected temperature obtained by the temperature detecting unit using the temperature as the temperature for correction obtained by the unit for determining a temperature for correction.

DESCRIPTION OF THE PREFERRED EMBODIMENTS

Figure 1:
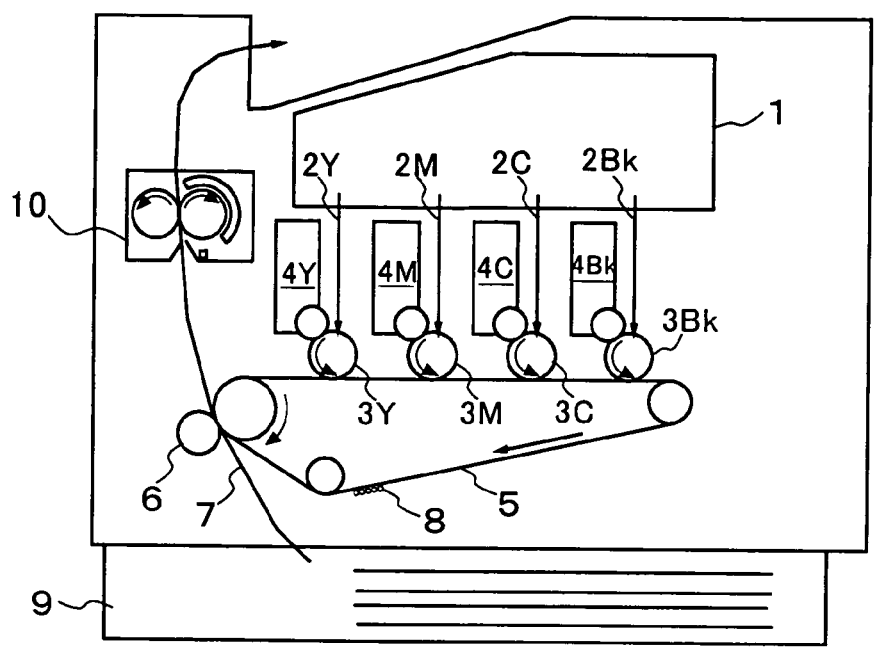
FIG. 1 is a cross sectional view of an image forming apparatus according to Embodiment 1 of the present invention.

A temperature determining device according to the present invention includes a temperature detecting unit that detects a temperature of a determination object member based on an intensity of infrared rays from the object member, a unit for determining a temperature for correction that determines a temperature of an opposing member opposed to the object member or a temperature of a member whose temperature changes in correlation to a change in the temperature of the opposing member, and a calculating unit that corrects the detected temperature obtained by the temperature detecting unit using the temperature as the temperature for correction obtained by the unit for determining a temperature for correction.

According to this configuration, stable temperature determination can be performed accurately without being influenced by infrared rays from the opposing member.

In the present invention, an "opposing member" refers to a member characterized by the following points. That is, at least a portion of a surface of the member is in a position from which a determination object member can be seen (namely, a position opposed to the object member). Further, the exchange of thermal energy can be performed between the member and the object member by radiation. For example, in a fixer of an electrophotographical apparatus utilizing induction heating, assuming that a fixing belt is a "determination object member", from among a paper guide, a fixer cover, a pressing roller, a temperature sensor, an excitation coil, a coil holding member, a rear core, structural members holding these members and the like, each of members in the respective positions opposed to the fixing belt can be used as an "opposing member".

Preferably, in the above-mentioned temperature determining device according to the present invention, the temperature detecting unit includes a thermopile that outputs a voltage corresponding to a temperature difference between a hot junction and a cold junction, and the unit for determining a temperature for correction determines a temperature of the cold junction of the thermopile. According to this configuration, a simplified configuration of the device can be achieved at lower cost.

Preferably, in this case, the calculating unit corrects the detected temperature using a first temperature for correction determined by the unit for determining a temperature for correction at a predetermined point in time before a point in time when the temperature detecting unit detects a temperature and a second temperature for correction determined by the unit for determining a temperature for correction at the point in time when the temperature detecting unit detects the temperature. According to this configuration, stable temperature determination can be performed accurately without being influenced by a temperature of the opposing member at a predetermined point in time before a point in time when the temperature detecting unit detects a temperature.

More specifically, preferably, the first temperature for correction is determined when heating of the object member is started. According to this configuration, stable temperature determination can be performed accurately without being influenced by a temperature of the opposing member at a point in time when heating is started.

Furthermore, a temperature correcting method according to the present invention includes a first step of detecting a temperature of a determination object member based on an intensity of infrared rays from the object member, a second step of determining a temperature of an opposing member opposed to the object member or a temperature of a member whose temperature changes in correlation to a change in the temperature of the opposing member, and a third step of correcting the detected temperature obtained in the first step using the temperature obtained in the second step.

According to this configuration, stable temperature determination can be performed accurately without being influenced by infrared rays from the opposing member.

Next, an image forming apparatus according to the present invention includes a fixing unit that allows a toner image transferred on a transferring material to be fixed on the transferring material by heating the toner image under pressure. In the image forming apparatus, the fixing unit includes a fixing member that is brought into contact with the transferring material so as to heat the transferring material, a heating source that heats the fixing member directly or indirectly, a temperature detecting unit that detects a surface temperature of the fixing member based on an intensity of infrared rays from the fixing member, a unit for determining a temperature for correction that determines a temperature of a constituent member of the fixing unit opposed to the fixing member or a temperature of a member whose temperature changes in correlation to a change in the temperature of the constituent member, and a calculating unit that corrects the detected temperature obtained by the temperature detecting unit using the temperature as the temperature for correction obtained by the unit for determining a temperature for correction.

According to this configuration, stable temperature determination of the fixing member can be performed accurately without being influenced by infrared rays from peripheral members of the fixing member. Thus, a high-quality image can be obtained stably.

Preferably, in the above-mentioned image forming apparatus according to the present invention, the fixing member is an open-ended tube or an endless belt. According to this configuration, while stable temperature determination of the fixing member can be performed accurately so as to allow a high-quality image to be obtained stably, since the thermal capacity of the fixing member is reduced, a fixing temperature can be attained in a shorter time.

Furthermore, preferably, in the above-mentioned image forming apparatus according to the present invention, the fixing member has a thickness of 0.02 mm to 0.6 mm. According to this configuration, while stable temperature determination of the fixing member can be performed accurately so as to allow a high-quality image to be obtained stably, since the thermal capacity of the fixing member is reduced, a fixing temperature can be attained in a shorter time.

Furthermore, preferably, in the above-mentioned image forming apparatus according to the present invention, a face of the fixing member opposed to the temperature detecting unit is a curved surface concave toward a side of the temperature detecting unit. According to this configuration, while stable temperature determination of the fixing member can be performed accurately so as to allow a high-quality image to be obtained stably, since the thermal capacity of the fixing member is reduced, a fixing temperature can be attained in a shorter time.

Furthermore, preferably, in the above-mentioned image forming apparatus according to the present invention, a face of the fixing member opposed to the temperature detecting unit has a surface roughness Ra of not more than 0.2 µm. According to this configuration, while stable temperature determination of the fixing member can be performed accurately so as to allow a high-quality image to be obtained stably, since the fixing member has a smooth surface, a fixed image with a gloss can be obtained.

Furthermore, preferably, in the above-mentioned image forming apparatus according to the present invention, the unit for determining a temperature for correction determines a temperature of a member in the fixing unit opposed to the fixing member. According to this configuration, stable. temperature determination of the fixing member can be performed accurately without being influenced by infrared rays from the member opposed to the fixing member, which exhibits a considerable amount of change in temperature. Thus, a high-quality image can be obtained stably.

Furthermore, preferably, in the above-mentioned image forming apparatus according to the present invention, the temperature detecting unit includes a thermopile that outputs a voltage corresponding to a temperature difference between a hot junction and a cold junction, and the unit for determining a temperature for correction determines a temperature of the cold junction of the thermopile. According to this configuration, a simplified configuration of the apparatus can be achieved at lower cost.

Preferably, in this case, the calculating unit corrects the detected temperature using a first temperature for correction determined by the unit for determining a temperature for correction at a predetermined point in time before a point in time when the temperature detecting unit detects a temperature and a second temperature for correction determined by the unit for determining a temperature for correction at the point in time when the temperature detecting unit detects the temperature. According to this configuration, stable temperature determination can be performed accurately without being influenced by a temperature of the opposing member at a predetermined point in time before a point in time when the temperature detecting unit detects a temperature. Thus, a high-quality image can be obtained stably.

More specifically, preferably, the first temperature for correction is determined when heating is started by the heating source. According to this configuration, stable temperature determination can be performed accurately without being influenced by a temperature of the opposing member at a point in time when heating is started. Thus, a high-quality image can be obtained stably.

Hereinafter, the present invention will be described in detail by way of specific embodiments. However, each of the following embodiments are to be regarded as an example, and the present invention is not limited thereto.

(Embodiment 1)

Figure 2:
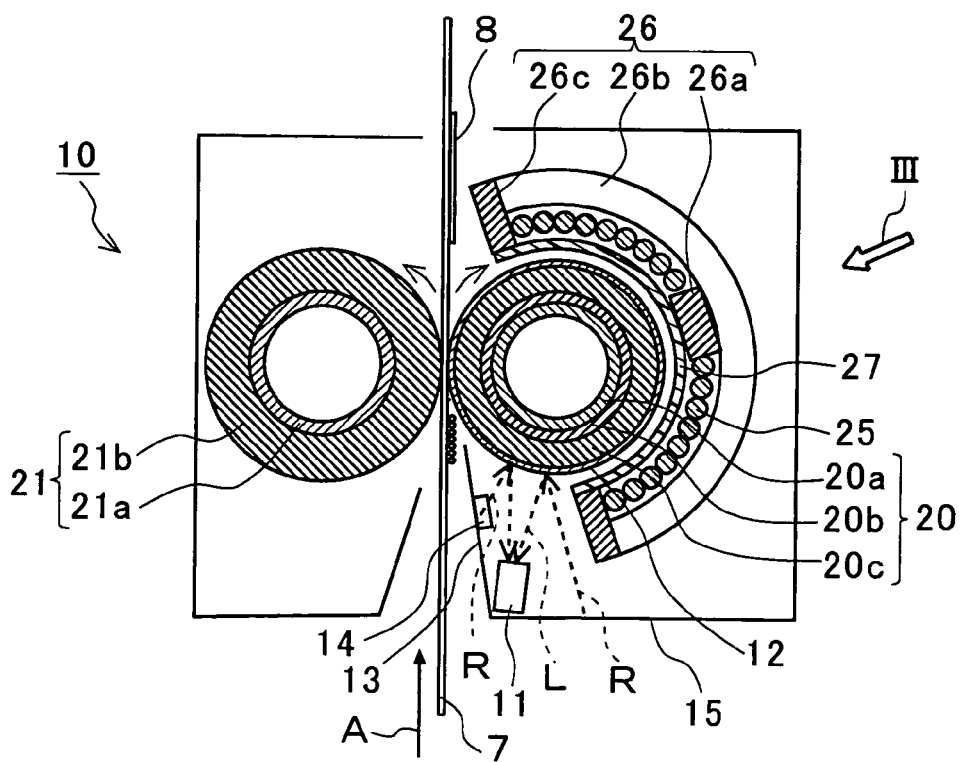
FIG. 2 is a cross sectional view of a fixer used in the image forming apparatus according to Embodiment 1 of the present invention.
Figure 3:
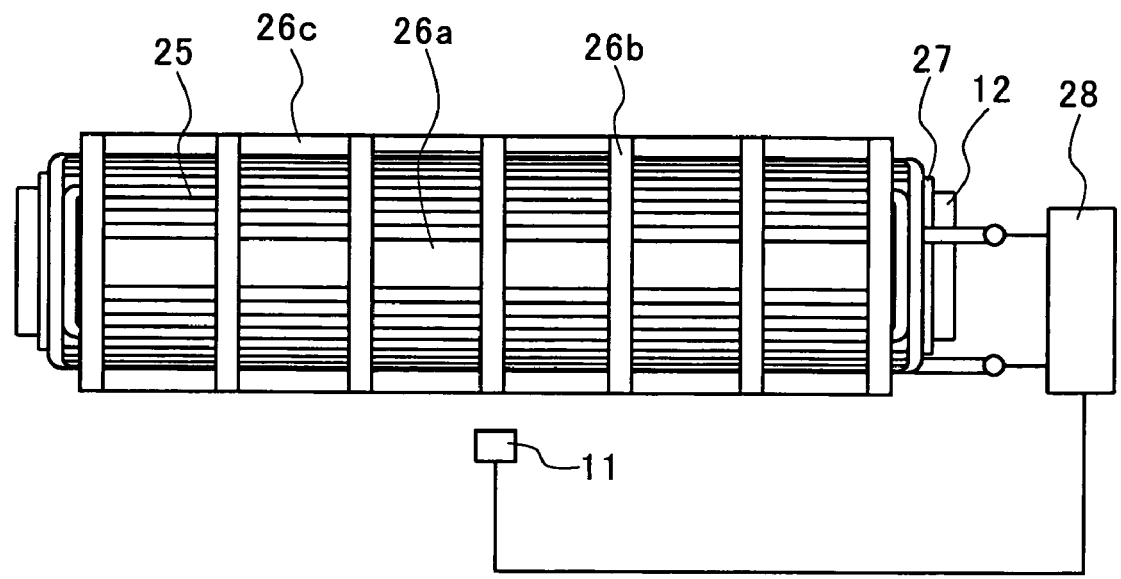
FIG. 3 is a rear view of a heating source including an excitation coil as seen from a direction indicated by an arrow III of FIG. 2.
Figure 4:
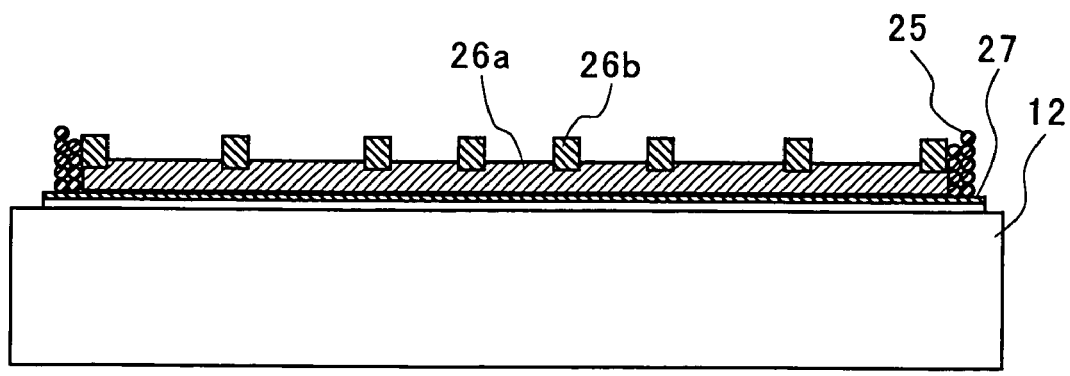
FIG. 4 is a cross sectional view of the heating source used in the image forming apparatus according to Embodiment 1 of the present invention.
Figure 5:
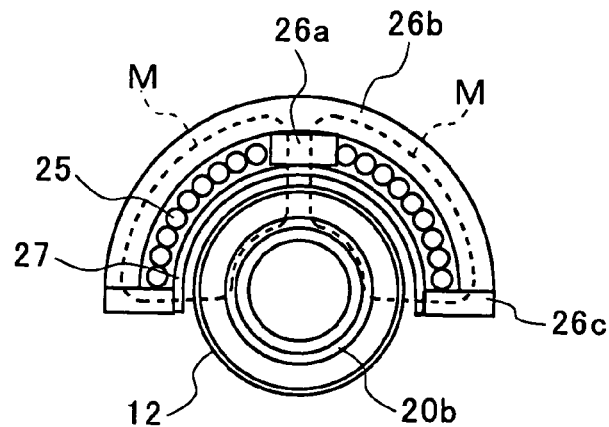
FIG. 5 is a diagram for explaining an induction heating action in the image forming apparatus according to Embodiment 1 of the present invention.
Figure 6:
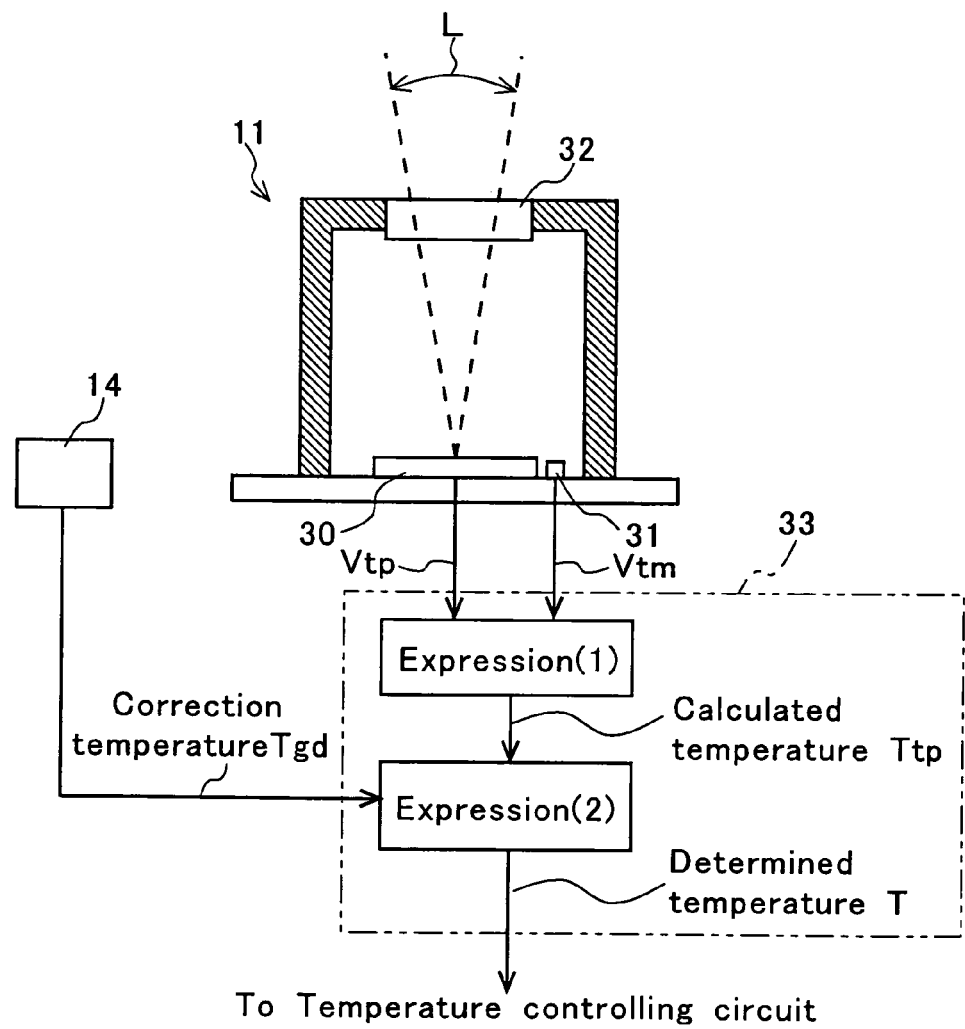
FIG. 6 is a structural view of a temperature sensor mounted in the image forming apparatus according to Embodiment 1 of the present invention.

FIG. 1 is a cross sectional view of an image forming apparatus according to Embodiment 1 of the present invention. FIG. 2 is an expanded sectional view of a fixer 10. FIG. 3 is a perspective view of a heating source including an excitation coil 25 as seen from a direction indicated by an arrow III shown in FIG. 2. FIG. 4 is a cross sectional view taken along a width direction (longitudinal direction) of the heating source including the excitation coil 25. FIG. 5 is a diagram for explaining an induction heating action of the heating source. FIG. 6 is structural view of a temperature sensor 11.

In FIG. 1, reference numeral 1 denotes an exposure device that outputs four laser beams 2Y, 2M, 2C and 2Bk corresponding respectively to image signals. Reference numerals 3Y, 3M, 3C and 3Bk denote photosensitive bodies on which latent images are formed by the laser beams 2Y, 2M, 2C and 2Bk, respectively. Reference numerals 4Y, 4M, 4C and 4Bk denote developers that apply toner respectively to the latent images on the photosensitive bodies 3Y, 3M, 3C and 3Bk so that the latent images are made manifest. The developers 4Y, 4M, 4C and 4Bk contain toners of four colors that are yellow, magenta, cyan and black, respectively. The photosensitive bodies and the developers are provided in four pairs that correspond respectively to the four toner colors of yellow, magenta, cyan and black.

Reference numeral 5 denotes an intermediate transfer belt that is held by supporting shafts and rotated in a direction shown in the figure. Toner images of the four toner colors on the photosensitive bodies 3Y, 3M, 3C and 3Bk are transferred in sequence and superimposed on a surface of the intermediate transfer belt 5.

Reference numeral 6 denotes a secondary transfer roller that is brought into/out of contact with the intermediate transfer belt 5. In a state where the secondary transfer roller 6 is in contact under pressure with the intermediate transfer belt 5, a recording paper sheet (transferring material) 7 is interposed between the secondary transfer roller 6 and the intermediate. transfer belt 5. Then, an electric field is applied thereto so that a toner image 8 is transferred to the recording paper sheet 7. Reference numeral 9 denotes a paper feeding unit that feeds the recording paper sheet 7 with synchronized timing.

Reference numeral 10 denotes the fixer that heats the recording paper sheet 7 on which the toner image 8 has been transferred under pressure at a fixing temperature of 170° C. so that the toner image 8 is fixed on the recording paper sheet 7. In the case of using recording paper sheets of different sizes (widths), paper passing is performed with reference to a center in the width direction (a normal direction in a plane including FIG. 1). Therefore, a small-sized recording paper sheet is passed only in a center portion.

In FIG. 2, reference numeral 11 denotes the temperature sensor that is placed at a center in the width direction (direction of a rotation center axis of a fixing belt 12) at a distance of 25 mm from the fixing belt 12 so as to be opposed to the fixing belt 12. The temperature sensor 11 will be described in detail later. Reference numeral 13 denotes a paper guide that guides the recording paper sheet 7. The paper guide 13 is formed from a metal having good thermal conductivity and opposed to the fixing belt 12 at a distance therefrom. Reference numeral 14 denotes a correction temperature sensor (unit for determining a temperature for correction) that has a thermistor element and determines the temperature of the paper guide 13. The correction temperature sensor 14 is provided desirably in the same position as that of the temperature sensor 11 in the width direction but also can be placed in a position different therefrom. Reference numeral 15 denotes a fixer cover that constitutes the fixer 10.

Reference numeral 12 denotes a fixing belt as a fixing member. The fixing belt 12 has the shape of a tube (or an endless belt) of 30 mm in diameter. The fixing belt 12 includes a nickel base material layer of 40 µm in thickness as an induction heat generating layer, an elastic layer of 200

μm in thickness that is formed from a silicone rubber, a mold releasing layer of 20 μm in thickness that is formed from a fluorocarbon resin that provides mold releasability such as PFA (tetrafluoroethylene-perfluoroalkylvinyl ether copolymer) or the like, which are provided outwardly. The fixing belt 12 has a thickness of 260 μm as a whole. In order to impart a gloss to the toner image 8, the fixing belt 12 is set to have a surface roughness Ra of 0.01 μm. Further, the fixing belt 12 has a length in the width direction (direction of the rotation axis) of 240 mm.

The surface of the fixing belt 12 may be coated with a single material or a combination of materials selected from resin and rubber that have excellent mold releasability such as PTFE (polytetrafluoroethylene), PFA (tetrafluoroethylene-perfluoroalkylvinyl ether copolymer), FEP (tetrafluoroethylene hexafluoropropylene copolymer) and the like. In order to impart a moderate gloss to the fixed toner image 8, the surface roughness Ra is set to be preferably not more than 0.2 μm, and more preferably not more than 0.05 μm.

Furthermore, the material of the induction heat generating layer is not limited to the above-mentioned material of nickel. The induction heat generating layer also may be formed of, for example, a metal such as stainless steel, aluminum or the like or a resin material in which a material provided with conductivity is dispersed so as to correspond to a property of a high-frequency current of an induction heating source.

In order to reduce the warm-up time required to attain a fixing temperature of 170° C., it is important that the fixing belt 12 should have a small thermal capacity. To this end, the fixing belt 12 has a thickness of preferably not more than 0.6 mm, more preferably not more than 0.5 mm, and most preferably not more than 0.4 mm. Moreover, in order to reduce the thermal capacity, the fixing belt 12 has a diameter of preferably not more than 60 mm, and more preferably not more than 45 mm. It is required that the thickness of the fixing belt 12 be determined so as to achieve sufficient durability and strength. In this respect, it is preferable that the fixing belt 12 is formed of a metallic base material of not less than 10 μm in thickness coated with a fluorocarbon resin in a thickness of not less than 10 μm. It is preferable that as a result of this, the fixing belt 12 has a thickness of not less than 20 μm as a whole.

Reference numeral 20 denotes a fixing roller that holds the fixing belt 12 on an outer periphery thereof so as to be integral with the fixing belt 12 and is supported rotatably. The fixing roller 20 includes a hollow metallic core 20a of stainless steel that has a thickness of 2 mm, a magnetic layer 20b of an insulating material that has a relative magnetic permeability of 20 and a thickness of 1.5 mm, and a sponge layer 20c of a foamed silicone rubber with a high heat insulating property and high elasticity that has a thickness of 5 mm and a hardness of Asker-C 45 degrees, which are laminated outwardly in this order.

Reference numeral 21 denotes a pressing roller as a pressing unit that is in contact under pressure with the fixing belt 12 with a pressing force of 300 N so as to form a fixing nip part. The pressing roller 21 is driven to rotate by a driving unit of a main body of the apparatus that is not shown in the figure, so that the fixing roller 20 and the fixing belt 12 are rotated following the rotation of the pressing roller 21 in a direction indicated by an arrow shown in the figure. The pressing roller 21 has an outer diameter of 30 mm and includes a hollow metallic core 21a of stainless steel that has a thickness of 2 mm, a silicone rubber layer 21b that has a thickness of 2 mm and a hardness of JIS A 65 degrees, and a PFA layer. (not shown) that has a thickness of 20 μm, which are provided outwardly. The rubber layer 21b of the pressing roller 21 may be formed from a heat-resistant rubber such as a fluorocarbon rubber or the like. Further, the surface of the pressing roller 21 may be coated with a single material or a combination of materials selected from fluorocarbon resin and fluorocarbon rubber that provide improved abrasion resistance and mold releasability such as PTFE, FEP and the like.

Reference numeral 25 denotes the excitation coil as an induction heating unit. The excitation coil 25 includes nine turns of a wire bundle composed of 60 wires of a copper wire that has an insulated surface and an outer diameter of 0.15 mm. The wire bundle is arranged, at each of end portions of a cylindrical face of the fixing belt 12 in the direction of the rotation center axis, in the form of an arc along an outer peripheral face of the cylindrical face, and in portions other than the end portions, along a direction of a generatrix of the cylindrical face.

As shown in the figure, in a cross section orthogonal to the rotation center axis of the fixing belt 12, the excitation coil 25 has a shape defined by the wire bundle that is arranged tightly without being overlapped (except at the end portions of the fixing belt 12) on an assumed cylindrical face formed around the rotation center axis of the fixing belt 12 so as to cover the fixing belt 12. Further, as shown in FIG. 4, at the end portions in the width direction, the wire bundle of the excitation coil 25 is overlapped in two rows and thus forced into bulges. As a result, the excitation coil 25 as a whole is formed into a saddle like shape. The excitation coil 25 is opposed to the outer peripheral face of the fixing belt 12 at a distance of about 3 mm therefrom.

Reference numeral 26 denotes a rear core of ferrite that is composed of a central core 26a that is inserted in an opening in a center of the wound wire bundle of the excitation coil 25, an arch-shaped arch core 26b, and an end core 26c that is provided at each end portion of the arch core 26b. Each of the central core 26a and the end core 26c has a bar-like shape continuous in the direction of the rotation center axis of the fixing belt 12 and is opposed to the fixing belt 12 without the excitation coil 25 interposed between them. Seven arch cores 26b are arranged at substantially a uniform distance from each other in the direction of the rotation center axis of the fixing belt 12 on a side opposite to the side of the fixing belt 12 with respect to the excitation coil 25. The central core 26a, the end cores 26c and the arch cores 25b are combined and connected magnetically. It is desirable that the rear core 26 be formed of, as well as ferrite, a material with a high magnetic permeability and a high resistance such as a Permalloy or the like.

Reference numeral 27 denotes a coil holding member that holds the excitation coil 25. The coil holding member 27 has a thickness of 1.5 mm and is formed from a resin with high heat resistance such as PEEK (polyether ether ketones), PPS (polyphenylene sulfide) or the like.

An alternating current at 30 kHz is applied to the excitation coil 25 from an excitation circuit 28 that is a voltage resonant inverter. Thus, the fixing belt 12 is heated by electromagnetic induction. The temperature of the fixing belt 12 is detected by the temperature sensor 11. An alternating current to be applied to the excitation coil 25 is controlled so as to allow the surface of the fixing belt 12 to be at a temperature of 170 degrees centigrade that is a set fixing temperature using a temperature signal obtained from the temperature sensor 11. Then, the recording paper sheet 7 with the unfixed toner image 8 transferred on its surface is allowed to enter the fixing nip part from a direction indicated by an arrow A of FIG. 2 so that the toner 8 is fixed on the recording paper sheet 7.

In this embodiment, the excitation coil 25 causes the fixing belt 12 to generate heat by electromagnetic induction. The following description is directed to this action with reference to FIG. 5.

As shown by each of broken lines M, magnetic flux generated by the excitation coil 25 due to an alternating current from the excitation circuit 28 penetrates the fixing belt 12 from the end core 26c and then reaches the magnetic layer 20b. Due to the magnetism of the magnetic layer 20b, the magnetic flux M passes through the magnetic layer 20b in a circumferential direction. Then, the magnetic flux M penetrates the fixing belt 12 again and then enters the central core 26a. After that, the magnetic flux M passes through the arch core 26b and then reaches the end core 26c. Due to the alternating current flowing through the excitation coil 25, the loop-shaped magnetic flux M changes. Due to this change in the magnetic flux M, an induction current is generated in the base material layer of the fixing belt 12, so that Joule heat is generated. The magnetic layer 20b has an insulation property and thus is not heated by induction.

Furthermore, the outer periphery of the metallic core 20a of the fixing roller 20 is covered with the magnetic layer 20b, and thus the magnetic flux M does not reach the metallic core 20a. As a result, an induction heating energy is not consumed directly to heat the metallic core 20a. Moreover, the fixing belt 12 is held by the sponge layer 20c with a high heat insulating property, thereby suppressing the flow of a thermal energy generated in the fixing belt 12 out to the magnetic layer 20b and the metallic core 20a. Accordingly, since the fixing belt 12 to be heated has a small thermal capacity and heat transfer from the fixing belt 12 hardly is caused, the temperature of the fixing belt 12 can be raised to a fixing temperature in a shorter time.

The description is directed next to the configuration of the temperature sensor 11. In FIG. 6, the temperature sensor 11 includes a thermopile 30 that outputs a voltage corresponding to the intensity of infrared rays from the fixing belt 12 as a determination object member and the temperature of a cold junction, and a thermistor 31 for compensating for the temperature of the cold junction of the thermopile 30. In front of the thermopile 30, a light-leading member 32 that is 3 mm in diameter and functions as an infrared transmitting filter and a light-collecting lens is provided. The light-leading member 32 is provided to monitor only infrared rays of a predetermined wavelength from a predetermined area of the fixing belt 12. The area whose temperature is determined though the light-leading member 32 is indicated by a broken line L in FIG. 6.

The thermopile 30 is formed of an array of thermocouples and outputs a voltage so as to correspond to a temperature difference between a hot junction that is heated by infrared irradiation and a cold junction that is not subjected to infrared irradiation. A voltage Vtm for temperature compensation from the thermistor 31 along with a detected voltage Vtp from the thermopile 30 is transmitted to a temperature calculating circuit 33. A calculated temperature Ttp is calculated on the basis of a thermopile output property expressed by the following expression (1).

$$Vtp = A \times (Ttp^4 - Ttm^4) + Vre \qquad (1)$$

where

A; output coefficient (the output coefficient A may be a constant and also may be a function of Ttm)

Ttp; calculated temperature

Ttm; temperature of the cold junction (calculated based on the voltage Vtm for temperature compensation obtained by the thermistor 31)

Vre; reference voltage of the temperature calculating circuit

The calculated temperature Ttp is a temperature obtained on the basis of the intensity of infrared rays incident on the thermopile 30 from the fixing belt 12. However, since the surface of the fixing belt 12 has a curvature defined by a diameter of 30 mm and is smooth, infrared rays (broken lines R shown in FIG. 2) radiated from peripheral members of the fixing belt 12 such as the paper guide 13 and the like are reflected therefrom. Therefore, after being reflected from the fixing belt 12, the infrared rays from the peripheral members also are incident on the thermopile 30. As a result, a change in the temperature of the peripheral members (namely, a change in the intensity of the infrared rays R) results also in a change in the calculated temperature Ttp given by the expression (1).

For example, it is assumed that when the fixing belt 12 is at a temperature of 170° C. and the paper guide 13 is at a temperature of 80° C., the output coefficient A is determined so that the calculated temperature Ttp has a value of 170° C. In this case, when the paper guide 13 is at a temperature of 20° C., due to a low intensity of infrared rays from the paper guide 13 that is reflected from the surface of the fixing belt 12 and then are incident on the thermopile 30, even when an actual value of the temperature of the fixing belt 12 is 170° C., the calculated temperature Ttp is determined with a value of 160° C.

Figure 7:
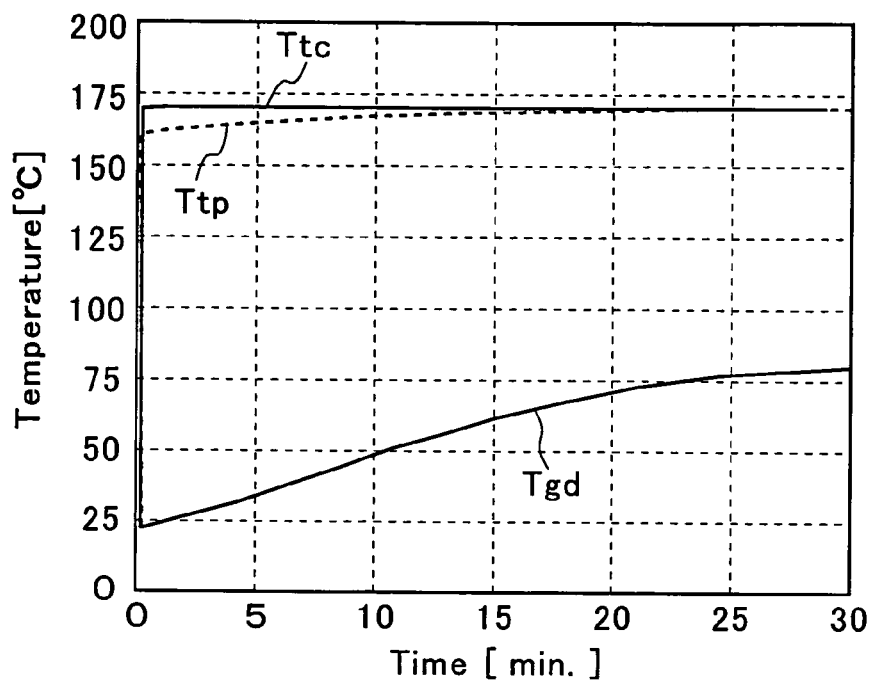
FIG. 7 is a graph showing a change in temperature caused when heating is started in the image forming apparatus according to Embodiment 1 of the present invention.

FIG. 7 shows how the calculated temperature Ttp, a calibrated temperature Ttc and a temperature Tgd of the paper guide 13 change when the temperature of the fixing belt 12 is raised from room temperature and kept at 170° C. The calibrated temperature Ttc is determined using a thermocouple as a temperature of a portion of the fixing belt 12 in the same position in the width direction as that of a portion whose temperature is to be determined by the thermopile 30. The temperature Tgd is determined by the correction temperature sensor 14. In the figure, a horizontal axis indicates time, and a vertical axis indicates temperature. When the temperature Tgd of the paper guide 13 becomes high and the temperature rising rate decreases, the calculated temperature Ttp is equal substantially to the calibrated temperature Ttc. However, at an early period when the temperature Tgd of the paper guide 13 is low, the calculated temperature Ttp is lower than the calibrated temperature Ttc.

Figure 8:
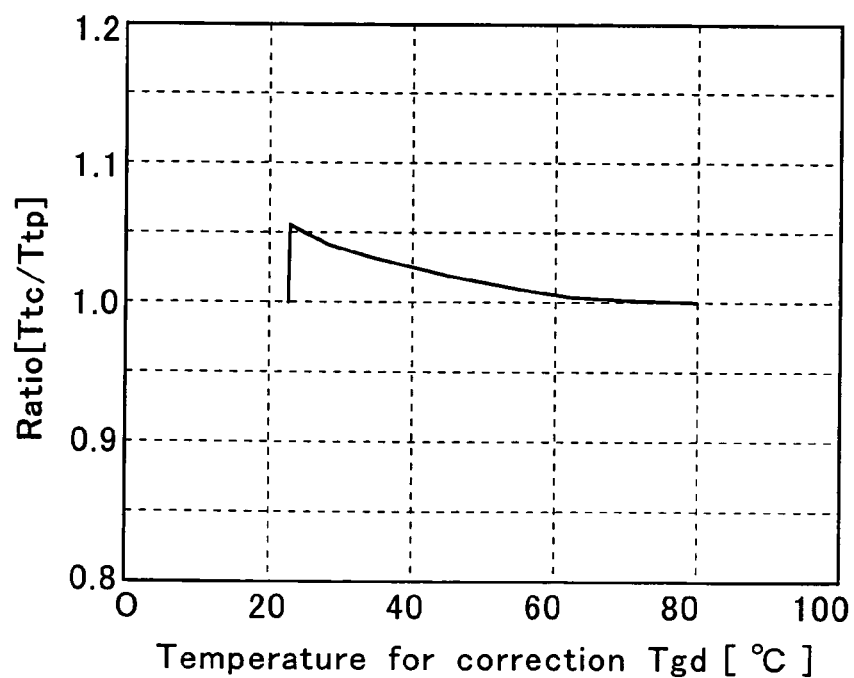
FIG. 8 is a graph showing a relationship between the temperature of a paper guide and a correction coefficient when heating is started in the image forming apparatus according to Embodiment 1 of the present invention.

As described above, an error between the calculated temperature Ttp and the calibrated temperature Ttc is correlated with the temperature Tgd of the paper guide 13. FIG. 8 shows a relationship between a ratio of the calculated temperature Ttp to the calibrated temperature Ttc (Ttc/Ttp, this ratio is referred to as a "correction coefficient") and the temperature Tgd of the paper guide 13. The figure shows that the more the ratio (Ttc/Ttp) on a vertical axis deviates from a value of 1, the larger an error of the calculated temperature Ttp with respect to the calibrated temperature Ttc. In the figure, a curved line portion of a solid line is approximated by a parabolic curve expressed by an expression (2).

$$Ttc/Ttp = A1 \times Tgd^2 + B1 \times Tgd + C1 \qquad (2)$$

where $A1 = 1.56 \times 10^{-5}$ $B1 = -2.53 \times 10^{-3}$ $C1 = 1.1017$

In the figure, a straight line portion at a left end portion of the solid line shows a behavior during temperature raising. FIG. 8 shows that the error (ratio (Ttc/Ttp)) increases with increasing temperature difference between the peripheral members of the fixing belt 12 and the fixing belt 12.

In this embodiment, the correction temperature sensor 14 is provided on the paper guide 13, and a determined temperature T is obtained by correcting the calculated temperature Ttp in the following manner. That is, a value of the right-hand side of the expression (2) using the temperature Tgd for correction detected by the correction temperature sensor 14 is multiplied by a value of the calculated temperature Ttp given by the expression (1). The corrected determined temperature T had a value equal to that of the calibrated temperature Ttc determined by the thermocouple.

The paper guide 13 is opposed most closely to the fixing belt 12 and thus exhibits a large amount of change in temperature. Therefore, with respect to a change in infrared rays that are reflected from the surface of the fixing belt 12 and then are incident on the thermopile 30, the paper guide 13 contributes in a larger degree than members apart from the fixing belt 12 such as the fixer cover 15 and the like. Thus, it is most effective to determine the temperature of the paper guide 13 by the correction temperature sensor 14 so that a value thus determined is used for the correction of the calculated temperature Ttp. Further, since the recording paper sheet 7 is not brought into contact under pressure with the paper guide 13, the amount of heat removed from the paper guide 13 by the recording paper sheet 7 is negligible. Accordingly, since the temperature of the paper guide 13 hardly changes depending on whether or not paper passing is performed, stable correction can be performed.

In the above-mentioned embodiment, the temperature Tgd of the paper guide 13 was used as the temperature for correction to be used for the correction of the calculated temperature Ttp. However, the present invention is not limited thereto, and the temperature of another member in the fixer 10 that is opposed to the fixing belt 12 may be selected for use as the temperature for correction. Moreover, the correction temperature sensor 14 may be provided on a member that is not opposed directly to the fixing belt 12 so that a temperature value thus obtained is used as the temperature for correction, as long as the temperature changes in correlation to a change in the temperature of a member opposed to the fixing belt 12. In addition, the correction temperature sensor 14 may be provided on each of a plurality of members so that a plurality of values of the temperature for correction are used for the correction of the calculated temperature Ttp.

Furthermore, in this embodiment, the rear core 26 is formed as a combination of the central core 26a and the end cores 26c that are provided at a distance from each other and the plurality of arch cores 26b that are provided at a distance from each other. Therefore, heat radiation from the outer peripheral faces of the rear core 26 and the excitation coil 25 is not hindered. Accordingly, even when current supply to the excitation coil 25 causes the excitation coil 25 to generate heat, the heat is not stored. Therefore, the temperature of the excitation coil 25, the rear core 26 and the coil holding member 27 can be prevented from being raised to a temperature higher than the temperature of the fixing belt 12. Thus, it is possible to prevent a phenomenon in which infrared rays radiated from a member at a high temperature are reflected from the surface of the fixing belt 12 and then are incident on the thermopile 30. As a result, an error occurring in temperature determination can be suppressed.

Furthermore, in this embodiment, since the fixing belt 12 is occupied on the inner side by the fixing roller 20, it is hardly possible to place a temperature detecting unit such as a thermistor or the like on the inner side of the fixing belt 12. Moreover, in the case where a contact type temperature sensor is used on the surface of the fixing belt 12, a streak (a flaw, a groove or the like) is caused due to a sliding operation on the surface of the fixing belt 12 and transferred on a fixed image, resulting in a considerable deterioration in image quality. According to this embodiment, the temperature of the surface of the fixing belt 12 that is a smooth cylindrical face can be determined accurately by a non-contact temperature sensor utilizing infrared rays, and thus no damage is caused to the surface of the fixing belt 12, thereby allowing a high-quality fixed image to be obtained.

Furthermore, since the thin fixing belt 12 is used so as to reduce the thermal capacity, heat transfer hardly is caused in the width direction. Accordingly, there is a large difference in the temperature of the fixing belt 12 between both the end portions outside a region used for image formation and the center portion within the region used for image formation. Therefore, when temperature control is performed by determining the temperature of the end portions of the fixing belt 12, a deterioration in image quality such as offset or the like may be caused. This is markedly the case particularly when using a small-sized recording paper sheet. According to this embodiment, the temperature of the fixing belt 12 at the center portion in the width direction is determined accurately by the non-contact temperature sensor utilizing infrared rays. As a result, the temperature of the fixing nip portion that contributes to image formation can be controlled accurately, thereby allowing a high-quality fixed image to be obtained without causing offset.

Furthermore, infrared rays from members disposed around the fixing belt 12 in an area increased with decreasing diameter and increasing curvature of the fixing belt 12 are reflected from the surface of the fixing belt 12 and then are incident on the thermopile 30. That is, in the case of using the fixing belt 12 that is decreased in diameter so as to be reduced in thermal capacity, a larger influence is exerted by infrared rays from the peripheral members of the fixing belt 12, and thus it becomes more likely to have an error in a detected temperature obtained by the thermopile 30. However, according to this embodiment, since correction is performed using the expression (2), even with the use of the fixing belt 12 that is reduced in size and thus is raised in temperature rapidly, stable determination of the surface temperature of the fixing belt 12 can be performed accurately.

As described above, according to this embodiment, a detected temperature from the temperature sensor 11 that detects the temperature of the fixing belt 12 based on the intensity of infrared rays is corrected on the basis of the temperature of the paper guide 13 in the fixer 10. Therefore, stable temperature determination of the fixing belt 12 can be performed accurately without being influenced by the temperature of the fixer 10. Thus, a high-quality image can be obtained stably.

In this embodiment, a quadratic expression of the temperature Tgd was used as the expression (2). However, depending on conditions under which the sensors are placed, a linear expression, a quartic expression, a quadratic expression in another form, or an expression of another function form of the temperature Tgd also can be used.

In the above-mentioned embodiment, the thermopile 30 was used as the temperature detecting unit (temperature sensor 11) that detected the temperature based on the intensity of infrared rays. In the present invention, the temperature detecting unit is not limited thereto, and a sensor that allows infrared rays to be incident on a thin film and determines the temperature of the thin film using a thermistor, a pyroelectric sensor, a photoelectric sensor or the like can be used. A thermopile allows an apparatus to be formed so as to have a simplified configuration at lower cost for the following reasons. That is, a thermopile does not require a switching unit for allowing/preventing the incidence of a light beam that is required in a pyroelectric sensor. Further, a thermopile is less costly compared with a photoelectric sensor. Moreover, a thermopile does not require a costly power source for signal output.

Furthermore, the configuration of the fixer 10 is not limited to that described with regard to the above-mentioned embodiment. In place of the fixing belt 12 and the fixing roller 20, a fixing hard roller that is formed of a metallic pipe of not less than 2 mm in thickness with a surface of a laminated structure of a silicone rubber or a fluorocarbon resin also may be used. Furthermore, a heating method is not limited to the above-mentioned induction heating, and heating also may be performed using a halogen lamp placed in an inner portion of the fixing hard roller.

In the case where a halogen lamp is placed in the fixing hard roller, generally, it takes about 2 minutes to attain a fixing temperature of 170° C. On the other hand, as in this embodiment, in the case where the fixing belt 12 having a small thermal capacity is raised in temperature by induction heating, the temperature of the fixing belt 12 reaches a fixing temperature of 170° C. in about 10 seconds. Therefore, at a point in time when the temperature of the fixing belt 12 is raised to the fixing temperature, almost no temperature rise has been caused in the other members constituting the fixer 10. However, in the case of a continuous operation, while the fixing belt 12 stays at the fixing temperature, the temperature of the fixer 10 as a whole is raised to about 90 degrees. This means that compared with the case of the fixing belt 12, the temperature raising of the peripheral members of the fixing belt 12 starts with a delay and is performed at a lower temperature rising rate. Thus, in a fixer that is raised in temperature rapidly, a considerable effect is attained by this embodiment in which temperature correction is performed in consideration of a change in the temperature of peripheral members.

(Embodiment 2)

The only difference between Embodiment 2 and Embodiment 1 lies in the following point. That is, as the temperature for correction, while the temperature of the paper guide 13 obtained by the correction temperature sensor 14 was used in Embodiment 1, a temperature Ttm obtained from a thermistor 31 for compensating for the temperature of a cold junction of a thermopile 30 is used in Embodiment 2. The following description is directed to the difference of Embodiment 2 from Embodiment 1.

In this embodiment, in place of the expression (2) described with regard to Embodiment 1, the following expression (3) is used to correct a calculated temperature Ttp so as to obtain a determined temperature Tfb.

$$Tfb = Ttp \times (A2 \times Ttm^2 B2 \times Ttm + C2) \quad (3)$$

where $$A2 = 1.57 \times 10^{-5}$$

$$B2 = -2.67 \times 10^{-3}$$

$$C2 = 1.1054$$

In this embodiment, using the temperature Ttm of the cold junction of the thermopile 30 for compensation, the temperature of the members opposed to the fixing belt 12 is assumed. The temperature of the members (for example, the paper guide 13) opposed to the fixing belt 12 is not necessarily equal to the temperature of the cold junction of the thermopile 30. However, the members and the cold junction are both heated by heat radiated from the fixing belt 12, and there is a correlation between a change in the temperature of the members and a change in the temperature of the cold junction. Therefore, using the temperature of the cold junction of the thermopile 30, the temperature of the members opposed to the fixing belt 12 can be assumed. Thus, using the temperature of members that are not opposed to the fixing belt 12, the intensity of infrared rays to be incident on the thermopile 30 can be corrected.

In this embodiment, the quadratic expression of the temperature Ttm was used as the expression (3). However, depending on conditions under which sensors are placed, a linear expression, a quartic expression, a quadratic expression in another form, or an expression of another function form of the temperature Ttm also can be used.

According to this embodiment, since it is not required that the correction temperature sensor 14 be provided, an apparatus can be formed so as to have a simplified configuration at lower cost. Since the thermopile 30 is provided with the thermistor 31 for the compensation of the cold junction, it is desirable that a thermopile be used as a temperature detecting unit that detects temperature based on the intensity of infrared rays.

(Embodiment 3)

Figure 9:
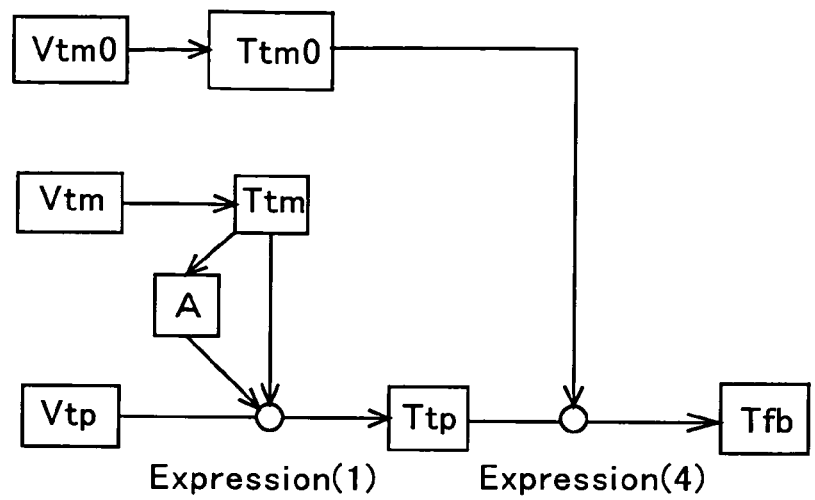
FIG. 9 is a diagram showing a procedure of temperature correction in an image forming apparatus according to Embodiment 3 of the present invention.

FIG. 9 is a structural view showing procedures of temperature correction according to Embodiment 3 of the present invention. Except for this, the respective configurations of members are the same as those described with regard to Embodiment 1, and like reference characters indicate like members that have the same functions as those described with regard to Embodiment 1, for which duplicate descriptions are omitted.

The differences between Embodiment 3 and Embodiment 1 lie in the following points. That is, firstly, as in Embodiment 2, a temperature Ttm of the cold junction of the thermopile 30 is used as the temperature for correction. Secondly, a temperature Ttm0 for correction of a fixer 10 obtained when temperature raising is started is used for temperature correction.

In performing correction using the expression (3) that is used in Embodiment 2 and does not depend on the temperature Ttm0 for correction obtained when temperature raising is started, the following problem has been presented. That is, due to the temperature of the fixer 10 obtained when temperature raising is started, an error may be caused between a temperature that is corrected and an actual temperature determined using the thermocouple.

This is caused due to a difference between the temperature of members opposed to a fixing belt 12 and a temperature assumed using the temperature of a cold junction. For example, it is assumed that heating of the fixing belt 12 is started in the case where the members opposed to the fixing belt 12 and the cold junction are both at a temperature of 10° C. when temperature raising is started. In this case, since the members opposed to the fixing belt 12 are raised in temperature more rapidly than the cold junction, when the temperature of the cold junction becomes 30° C., the temperature of the members opposed to the fixing belt 12 reaches 60° C. On the other hand, it is assumed that heating of the fixing belt 12 is started in the case where the members opposed to the fixing belt 12 and the cold junction are both at a temperature of 30° C. when temperature raising is started. In this case, when the temperature of the cold junction is 30° C., the temperature of the members opposed to the fixing belt 12 may stay at 30° C. Thus, in performing correction of a calculated temperature Ttp obtained by a temperature sensor 11, in some cases, the temperature of the members opposed to the fixing belt 12 at one point in time cannot be assumed accurately by using the temperature Ttm of the cold junction alone, which is used in place of the temperature of the members opposed to the fixing belt 12.

Figure 10:
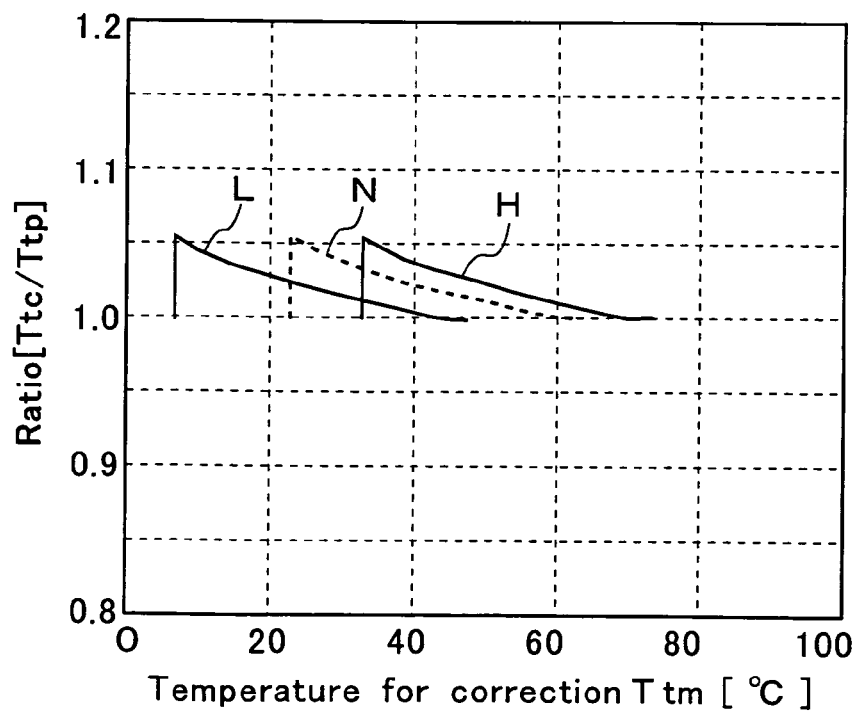
FIG. 10 is a graph showing a relationship between the temperature of a cold junction and a correction coefficient when heating is started in the image forming apparatus according to Embodiment 3 of the present invention.
Figure 11:
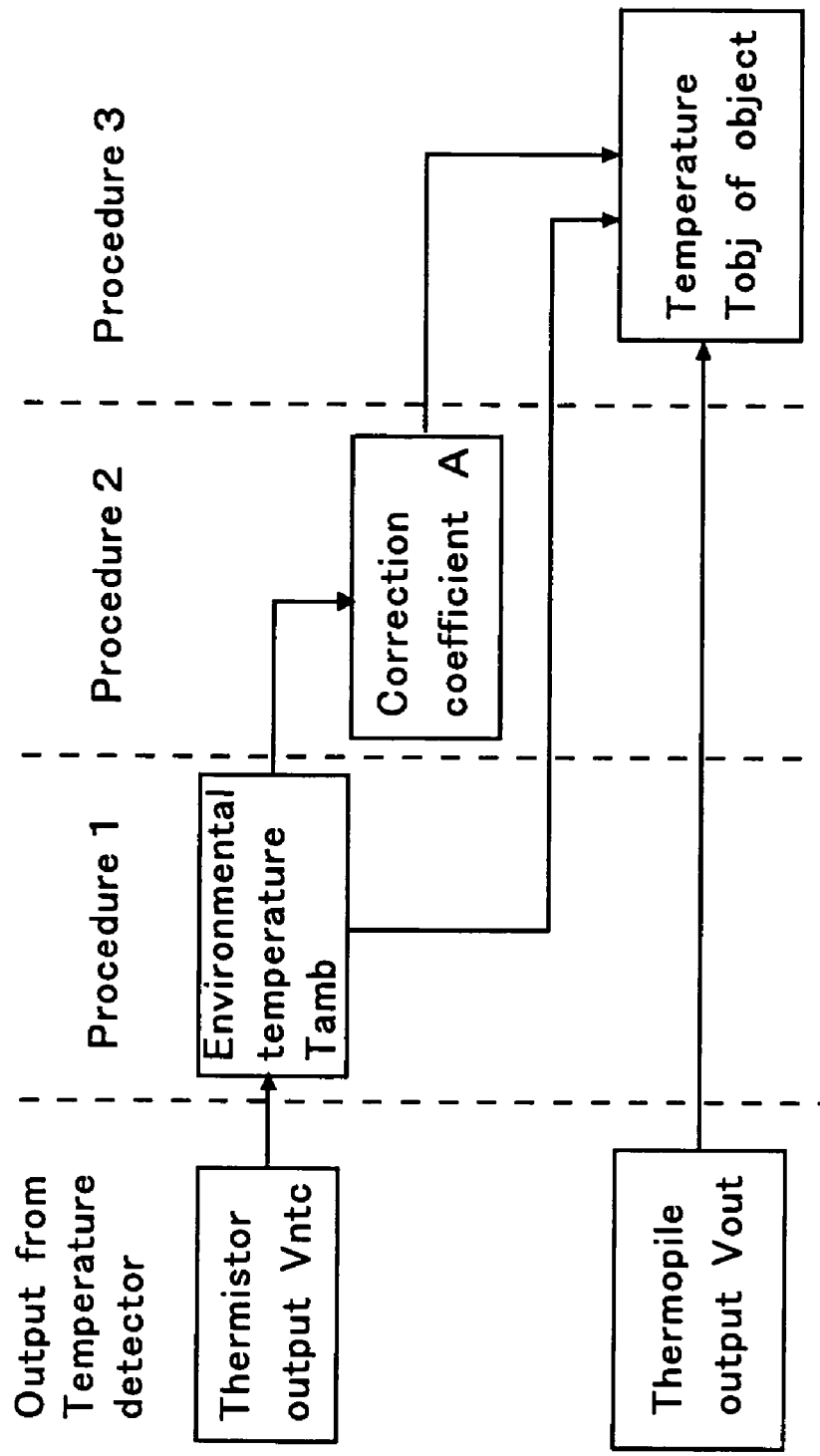
FIG. 11 is a diagram showing a conventional procedure of temperature calculation using an infrared temperature detector.

FIG. 10 shows a relationship between a temperature obtained when temperature raising is started and a correction coefficient in the case where the temperature of the fixing belt 12 is raised and then is kept constant. In the figure, a horizontal axis indicates the determined temperature Ttm of the cold junction of the thermopile 30, and a vertical axis indicates a correction coefficient, i.e. a ratio (Ttc/Ttp) between the calculated temperature Ttp obtained by the temperature sensor 11 before being corrected and a calibrated temperature Ttc obtained using the thermocouple. Curves L, N and H show results obtained in the cases where the temperature Ttm0 of the cold junction obtained when temperature raising is started is 7° C., 23° C. and 33° C., respectively. As shown in the figure, a parabolic curve of the correction coefficient may vary depending on the temperature Ttm0 obtained when temperature raising is started. These curves have a shape obtained by moving the parabolic curve in a direction parallel to a direction of the horizontal axis so as to correspond to the temperature Ttm0 obtained when temperature raising is started.

In this embodiment, an expression (4) is used as a correction expression for obtaining a determined temperature Tfb using the calculated temperature Ttp.

$$Tfb = Ttp \times \{A3 \times (Ttm - f(Ttm0))^2 + C3\} \quad (4)$$

where $$f(Ttm0) = Ttm0 + 61.8$$

$$A3 = 1.57 \times 10^{-5}$$

$$C3 = 0.992$$

The expression (4) indicates that the parabolic curve of the correction coefficient (Ttc/Ttp) expressed by a quadratic expression is moved in the direction parallel to the direction of the horizontal axis of a graph shown in FIG. 10 so as to correspond to the temperature Ttm0 for correction obtained when temperature raising is started.

A phenomenon shown in FIG. 10 is caused because the cold junction and the members opposed to the fixing belt 12 are both started to be raised in temperature from a temperature substantially equal to an atmospheric temperature at one point in time when temperature raising is started. Thus, by the use of the correction expression (4) incorporating the temperature Ttm0 obtained when temperature raising is started, stable temperature determination of the fixing belt 12 could be performed regardless of a temperature obtained when temperature raising is started.

In this embodiment, depending on the conditions under which the sensors are placed, a function f(Ttm0) of Ttm0 of the expression (4) may be replaced by a linear expression in another form, a quadratic expression, or an expression of another function form of Ttm0. Further, a variable for a function is not limited to Ttm0. For example, a voltage value Vtm obtained by a thermistor 31 before being converted to a temperature value may be used directly.

In each of Embodiments 1 to 3 described above, as an example, the temperature determining device and the temperature correcting method according to the present invention was applied to an image forming apparatus. However, the applications of the temperature determining device and the temperature correcting method according to the present invention are not limited thereto. The temperature determining device and the temperature correcting method according to the present invention are applicable to temperature determination of a surface performed on the basis of the intensity of infrared rays. In such temperature determination, a considerable effect can be attained particularly in each of the cases where: the surface has a curvature defining a surface concave toward a side of a temperature sensor; the surface is smooth and thus is likely to reflect infrared rays from peripheral members; and heat transfer is reduced in the surface whose temperature is to be determined.

The embodiments disclosed in this application are intended to illustrate the technical aspects of the invention and not to limit the invention thereto. The invention may be embodied in other forms without departing from the spirit and the scope of the invention as indicated by the appended claims and is to be broadly construed.

What is claimed is:

1. A temperature determining device, comprising:
    a temperature detecting unit that detects a temperature of a determination object member based on an intensity of infrared rays from the object member;
    a unit for determining a temperature for correction that determines a temperature of an opposing member opposed to the object member or a temperature of a member whose temperature changes in correlation to a change in the temperature of the opposing member; and
    a calculating unit that corrects the detected temperature obtained by the temperature detecting unit using an environmental temperature around the temperature detecting unit and said temperature for correction,
    wherein the calculating unit includes at least a unit that multiplies the detected temperature obtained by the temperature detecting unit by a coefficient that changes in relation to said temperature for correction.

2. The temperature determining device according to claim 1,
    wherein the temperature detecting unit includes a thermopile that outputs a voltage corresponding to a temperature difference between a hot junction and a cold junction, and
    the calculating unit corrects the detected temperature using a temperature of the cold junction of the thermopile as the environmental temperature.

3. The temperature determining device according to claim 2,
    wherein the unit for determining a temperature for correction determines the temperature of the cold junction of the thermopile.

4. The temperature determining device according to claim 1,
    wherein the calculating unit corrects the detected temperature using a first temperature for correction determined by the unit for determining a temperature for correction at a predetermined point in time before a point in time when the temperature detecting unit detects a temperature and a second temperature for correction determined by the unit for determining a temperature for correction at the point in time when the temperature detecting unit detects the temperature.

5. The temperature determining device according to claim 4,
    wherein the first temperature for correction is determined when heating of the object member is started.

6. The temperature determining device according to claim 1,
    wherein the calculating unit includes at least a unit that adds to the detected temperature a temperature obtained by multiplying the detected temperature, after said detected temperature has been corrected based on a function of the environmental temperature, by a coefficient that is not negative and changes in relation to said temperature for correction.

7. The temperature determining device according to claim 1,
wherein the coefficient is expressed by a function that decreases monotonically as the temperature for correction increases.

8. A temperature correcting method, comprising:
a first step of detecting a temperature of a determination object member based on an intensity of infrared rays from the object member;
a second step of determining a temperature of an opposing member opposed to the object member or a temperature of a member whose temperature changes in correlation to a change in the temperature of the opposing member;
a third step of correcting the detected temperature obtained in the first step using an environmental temperature around a temperature detecting unit that detects said temperature of the object member; and
a fourth step of further correcting the detected temperature where the outcome of the third step is corrected based on a function of the temperature for correction obtained in the second step,
wherein the fourth step includes at least a step of multiplying the detected temperature by a coefficient that changes in relation to the temperature for correction, wherein the temperature for correction is obtained in the second step.

9. The temperature correcting method according to claim 8,
wherein the fourth step includes at least a step of adding to the detected temperature a temperature obtained by multiplying the detected temperature by a coefficient that is not negative and changes in relation to the temperature for correction.

10. The temperature correcting method according to claim 8,
wherein the coefficient is expressed by a function that decreases monotonically as the temperature for correction increases.

11. An image forming apparatus comprising a fixing unit that allows a toner image transferred on a transferring material to be fixed on the transferring material by heating the toner image under pressure,
wherein the fixing unit comprises:
a fixing member that is brought into contact with the transferring material so as to heat the transferring material;
a heating source that heats the fixing member directly or indirectly;
a temperature detecting unit that detects a surface temperature of the fixing member based on an intensity of infrared rays from the fixing member;
a unit for determining a temperature for correction that determines a temperature of a constituent member of the fixing unit opposed to the fixing member or a temperature of a member whose temperature changes in correlation to a change in the temperature of the constituent member; and
a calculating unit that corrects the detected temperature obtained by the temperature detecting unit using an environmental temperature around the temperature detecting unit and said temperature for correction,
wherein the calculating unit includes at least a unit that multiplies the detected temperature obtained by the temperature detecting unit by a coefficient that changes in relation to said temperature for correction.

12. The image forming apparatus according to claim 11, wherein the fixing member is an open-ended tube or an endless belt.

13. The image forming apparatus according to claim 11, wherein the fixing member has a thickness of 0.02 mm to 0.6 mm.

14. The image forming apparatus according to claim 11, wherein a face of the fixing member opposed to the temperature detecting unit is a curved surface concave toward a side of the temperature detecting unit.

15. The image forming apparatus according to claim 11, wherein a face of the fixing member opposed to the temperature detecting unit has a surface roughness Ra of not more than 0.2 $\mu$m.

16. The image forming apparatus according to claim 11, wherein the unit for determining a temperature for correction determines a temperature of a member in the fixing unit opposed to the fixing member.

17. The image forming apparatus according to claim 11, wherein the temperature detecting unit includes a thermopile that outputs a voltage corresponding to a temperature difference between a hot junction and a cold junction, and
the unit for determining a temperature for correction determines a temperature of the cold junction of the thermopile.

18. The image forming apparatus according to claim 17, wherein the calculating unit corrects the detected temperature using a first temperature for correction determined by the unit for determining a temperature for correction at a predetermined point in time before a point in time when the temperature detecting unit detects a temperature and a second temperature for correction determined by the unit for determining a temperature for correction at the point in time when the temperature detecting unit detects the temperature.

19. The image forming apparatus according to claim 18, wherein the first temperature for correction is determined when heating is started by the heating source.

20. A temperature determining device, comprising:
a temperature detecting unit that detects a temperature of a determination object member based on an intensity of infrared rays from the object member;
a unit for determining a temperature for correction that determines a temperature of an opposing member opposed to the object member or a temperature of a member whose temperature changes in correlation to a change in the temperature of the opposing member; and
a calculating unit that corrects the detected temperature obtained by the temperature detecting unit using an environmental temperature around the temperature detecting unit and said temperature for correction,
wherein the calculating unit includes at least a unit that determines a correction amount and adds to the detected temperature the correction amount that decreases as the temperature for correction increases, after said detected temperature has been corrected based on a function of the environmental temperature.

21. The temperature determining device according to claim 20,
wherein the temperature detecting unit includes a thermopile that outputs a voltage corresponding to a temperature difference between a hot junction and a cold junction, and the calculating unit corrects the detected temperature using a temperature of the cold junction of the thermopile as the environmental temperature.

22. The temperature determining device according to claim 21,
wherein the unit for determining a temperature for correction determines the temperature of the cold junction of the thermopile.

23. The temperature determining device according to claim 20,
wherein the calculating unit corrects the detected temperature using a first temperature for correction determined by the unit for determining a temperature for correction at a predetermined point in time before a point in time when the temperature detecting unit detects a temperature and a second temperature for correction determined by the unit for determining a temperature for correction at the point in time when the temperature detecting unit detects the temperature.

24. The temperature determining device according to claim 23,
wherein the first temperature for correction is determined when heating of the object member is started.

25. A temperature correcting method, comprising:
a first step of detecting a temperature of a determination object member based on an intensity of infrared rays from the object member;
a second step of determining a temperature of an opposing member opposed to the object member or a temperature of a member whose temperature changes in correlation to a change in the temperature of the opposing member;
a third step of further correcting the detected temperature obtained in the first step using an environmental temperature around a temperature detecting unit that detects said temperature of the object member; and
a fourth step of further correcting the detected temperature where the outcome of the third step is corrected based on a function of the temperature for correction obtained in the second step,
wherein the fourth step includes at least a step of determining a correction amount and adding to the detected temperature the correction amount that decreases as the temperature for correction increases, after said detected temperature has been corrected in the third step.

26. An image forming apparatus comprising a fixing unit that allows a toner image transferred on a transferring material to be fixes on the transferring material by heating the toner image under pressure,
wherein the fixing unit comprises:
a fixing member that is brought into contact with the transferring material so as to heat the transferring material;
a heating source that heats the fixing member directly or indirectly;
a temperature detecting unit that detects a surface temperature of the fixing member based on an intensity of infrared rays from the fixing member;
a unit for determining a temperature for correction that determines a temperature of a constituent member of the fixing unit opposed to the fixing member or a temperature of a member whose temperature changes in correlation to a change in the temperature of the constituent member, and
a calculating unit that corrects the detected temperature obtained by the temperature detecting unit using an environmental temperature around the temperature detecting unit and said temperature for correction,
wherein the calculating unit includes at least a unit that determines a correction amount and adds to the detected temperature the correction amount that decreases as the temperature for correction increases, after said detected temperature has been corrected based on a function of the environmental temperature.

27. The image forming apparatus according to claim 26, wherein the fixing member is an open-ended tube or an endless belt.

28. The image farming apparatus according to claim 26, wherein the fixing member has a thickness of 0.02 mm to 0.6 mm.

29. The image forming apparatus according to claim 26, wherein a face of the fixing member opposed to the temperature detecting unit is a curved surface concave toward a side of the temperature detecting unit.

30. The image forming apparatus according to claim 26, wherein a face of the fixing member opposed to the temperature detecting unit has a surface roughness Ra of not more than 0.2 $\mu$m.

31. The image forming apparatus according to claim 26, wherein the unit for determining a temperature for correction determines a temperature of the member in the fixing unit opposed to the fixing member.

32. The image forming apparatus according to claim 26, wherein the temperature detecting unit includes a thermopile that outputs a voltage corresponding to a temperature difference between a hot junction and a cold junction, and
the unit for determining a temperature for correction determines a temperature of the cold junction of the thermopile.

33. The image forming apparatus according to claim 32, wherein the calculating unit corrects the detected temperature using a first temperature for correction determined by the unit for determining a temperature for correction at a predetermined point in time before a point in time when the temperature detecting unit detects a temperature and a second temperature for correction determined by the unit for determining a temperature for correction at the point in time when the temperature detecting unit detects temperature.

34. The image forming apparatus according to claim 33, wherein the first temperature for correction is determined when heating is started by the heating source.

* * * * *

UNITED STATES PATENT AND TRADEMARK OFFICE
CERTIFICATE OF CORRECTION

PATENT NO. : 6,964,515 B2 Page 1 of 1
DATED : November 15, 2005
INVENTOR(S) : Asakura et al.

It is certified that error appears in the above-identified patent and that said Letters Patent is hereby corrected as shown below:

Column 19,
Line 47, "to be fixes" should read -- to be fixed --.

Column 20,
Line 20, "image farming" should read -- image forming --.

Signed and Sealed this

Sixth Day of June, 2006

JON W. DUDAS
*Director of the United States Patent and Trademark Office*